(12) United States Patent
Martinez et al.

(10) Patent No.: US 6,389,118 B1
(45) Date of Patent: *May 14, 2002

(54) METHODS AND APPARATUS FOR CONNECTING A TELEPHONE SUBSCRIBER TO A PERIPHERAL DEVICE

(76) Inventors: Edgar Martinez, 19 Sunset Dr., White Plains, NY (US) 10604; Mark A. Glemboski, 12 Deer Pond Rd., Newton, NJ (US) 07860

(*) Notice: Subject to any disclaimer, the term of this patent is extended or adjusted under 35 U.S.C. 154(b) by 0 days.

This patent is subject to a terminal disclaimer.

(21) Appl. No.: 09/026,257

(22) Filed: Feb. 19, 1998

Related U.S. Application Data

(63) Continuation of application No. 08/763,518, filed on Dec. 11, 1996, now Pat. No. 5,784,437, which is a continuation of application No. 08/267,792, filed on Jun. 28, 1994, now abandoned, which is a continuation of application No. 08/093,450, filed on Jul. 19, 1993, now abandoned, which is a continuation of application No. 07/995,521, filed on Dec. 21, 1992, now abandoned, which is a continuation of application No. 07/676,863, filed on Mar. 28, 1991, now abandoned.

(51) Int. Cl.⁷ ............................ H04M 1/64; H04M 3/42
(52) U.S. Cl. .............................. 379/88.24; 379/88.04; 379/207.04; 379/207.07; 379/216.01
(58) Field of Search .......................... 379/88.12, 88.13, 379/88.22, 216, 67.1, 84, 88.24, 88.27, 201, 210, 207, 212, 214, 207.02, 207.04, 207.06, 207.07, 88.01, 88.02, 88.04, 216.01

(56) References Cited

U.S. PATENT DOCUMENTS

| 4,706,280 A | * | 11/1987 | Barbare et al. | ............. 379/284 |
| 5,450,488 A | * | 9/1995 | Pugaczewski et al. | ..... 379/67.1 |
| 6,233,315 B1 | * | 5/2001 | Reformato et al. | ...... 379/88.01 |

* cited by examiner

Primary Examiner—Fan Tsang
Assistant Examiner—Ovidio Escalante

(57) ABSTRACT

An electronic switch in a telephone system provides automatic connection of a subscriber going off-hook to a SN/IP, while at the same time remaining responsive to dialing by the subscriber. The switch also permits access code dialing connection to the SN/IP and provides dial pulse to DTKF conversion over the connection path. Upon request by a off-hook subscriber connected to the SN/IP by the switch, the SN/IP can perform dialing or invoke other call features which will be processed by the switch as if requested by the off-hook subscriber.

37 Claims, 6 Drawing Sheets

Subscriber Dialing Call without IP Assist

IP Dialing Call for Subscriber

NFA CALL STATE TABLE-NETWORK VIEW

| State | Switch Event | Switch Active | Next State |
|---|---|---|---|
| Subscribe Idle (N0) | Detect Off-Hook | Digit Receiver to Subscriber<br>Provide Dial Tone<br>Start ROH Timer<br>Seize IP Trunk<br>Send Service Code + Subscriber ID# | Waiting for IP (N1) |
| Waiting for IP (N1) | Ans. Sup. From IP | Remove Dial Tone<br>2-way Voice Path: User <--> IP | Implicit Mode (N2) |
| | User Starts Dialing | Clear ROH Timer<br>Release IP | User Proceeding (N3) |
| | ROH Time Expired | ROH Treatment<br>Release IP | Subscriber Idle (N0) |
| | User Hang-Up | Release IP | Subscriber Idle (N0) |
| Implicit Mode (N2) | User Starts Dialing | Clear ROH Timer<br>Release IP | User Proceeding (N3) |
| | Inverted Wink From IP | Clear ROH Timer<br>Connect DTMF Rcvr. to IP<br>Wink to IP | IP Proceeding (N3) |
| | User Hang-Up | Release IP | Subscriber Idle (N0) |
| | ROH Time Expired | ROH Treatment | Subscriber Idle (N0) |
| User Proceeding (N3) | Digit Analysis | Collect Digits | User Proceeding (N3) |
| | Addr. Digits Complete | Release Digit Receiver | Digits Received (N4) |
| IP Proceeding (N3) | Digit Analysis | Collect Digits | IP Proceeding (N3) |
| | Addr. Digits Complete | Release Digit Receiver | Digits Received (N4) |

FIG. 7A

| FIG. 7A |
|---|
| FIG. 7B |

FIG. 7

METHODS AND APPARATUS FOR CONNECTING A TELEPHONE SUBSCRIBER TO A PERIPHERAL DEVICE

RELATED APPLICATIONS

This application is a continuation of allowed U.S. patent application Ser. No. 08/763,518 which was filed on Dec. 11, 1996 now U.S. Pat. No. 5,784,437, which is a filewrapper continuation of now abandoned U.S. patent application Ser. No. 08/267,792, filed on Jun. 28, 1994 which is a continuation of now abandoned U.S. patent application Ser. No. 08/093,450, filed on Jul. 19, 1993, which is a continuation of now abandoned U.S. patent application Ser. No. 07/995,521, filed on Dec. 21, 1992, which is a continuation of now abandoned U.S. patent application Ser. No. 07/676,863, which was filed on Mar. 28, 1991.

BACKGROUND OF THE INVENTION

This invention relates to an electronic switch in a telephone system and, in-particular, to an electronic switch which provides call routing and connection to service node/intelligent peripherals.

Electronic switches are in use today which enable subscribers to be routed to so called "service node/intelligent peripherals" (referred to hereinafter as "SN/IPs" or "IPs"). Typically, a SN/IP is a facility in the telephone system which can be called by a subscriber for some specified service. These facilities are usually provided with some degree of intelligence so that the subscriber and SN/IP can communicate in an interactive fashion. Examples of SN/IPs in use today are the voice mail service nodes now being offered by telephone companies to subscribers for voice mail services.

In present telephone systems which employ SN/IPs, for a subscriber to gain access to a SN/IP, the subscriber must first dial an access code or number. This dialed access code is then analyzed like a normal call by the call routing digit receiver and analyzer functionality of the switch. Once the digits are analyzed and the SN/IP identified, the call is routed by the switch to the SK/IP over an appropriate communication path. After connection to the SN/IP, to place another call the subscriber must first hang up, i.e., go on-hook, to cause the switch to terminate the communication path with the SN/IP.

Also, when connected to a SN/IP, all existing systems require that any digit transmission be dual tone multiple frequency (DTMF) transmission.

The latter requirement prevents subscribers with dial pulse transmissions, i.e., rotary dialing equipment, from being able to use the SN/IP facilities. Also, the need to initially dial an access code to reach a SN/IP and to have to terminate or hang-up in order to be able to dial a further call when connected to a SN/IP present drawbacks with respect to time, effort and demands placed on the subscriber.

It is, therefore, an object of the present invention to provide an electronic switch and SN/IP in a telephone system which have been improved to avoid the aforesaid-drawbacks.

It is a further object of the present to provide the aforesaid improved switch and SN/IP, while preserving other normal and usual electronic switch functions.

SUMMARY OF THE INVENTION

In accordance with a first aspect of the present invention, the above and other objectives are in part realized in an electronic switch which is adapted to provide routing and connection of a subscriber to a SN/IP in response to an off-hook status for the subscriber. The electronic switch is further adapted to be able to receive and analyze dialed digits from the off-hook subscriber for further call routing and connection both when the aforesaid connection to the SN/IP is being established and during its maintenance. To this end, the switch is additionally adapted, upon receipt of dialed digits from the subscriber, to terminate the connection process with respect to the SN/IP and to process the received digits via its digit analyzer functionality in the normal manner.

With the electronic switch of the invention so adapted, a subscriber going off-hook is automatically connected with an associated SN/IP and the subscriber can interact with the SNJ,IP immediately and without any need to dial. Furthermore, since dialed digits from the subscriber can still be received and processed by the digit analyzer functionality of the switch and since connection to the SN/IP is dropped upon dialed digits being received, the subscriber is free to make a call at any time without having to hang-up.

In the embodiment of the invention to be disclosed hereinafter, the electronic switch includes an off-hook status functionality for detecting off-hook status of a subscriber, a routing digit receiver and analyzer functionality for receiving and analyzing dialed digits, a routing and connection functionality for routing and connecting calls and a control functionality for effecting overall control of the other functionalities.

In a further aspect of the invention, the electronic switch of the invention is additionally adapted to provide call routing and connection of a subscriber to a SN/IP through conventional access code dialing and conventional routing, but with the added functionality of dial pulse to DTMF conversion for digits transmitted over the established communication path. In this way, coded access to a SN/IP over a stable communication path (i.e., one established by dialed digits) can be effected for subscribers with dial pulse dialing.

In yet a further aspect of the present invention, the SN/IP is adapted to perform dialing functions and to invoke call features (transfer, etc.) for a subscriber connected to the SN/IP (either through off-hook status or access code dialing) upon the request of the subscriber and the electronic switch functionality is further adapted to process these dialing functions and call features as if made by the subscriber, including billing of requested calls to the associated subscriber.

BRIEF DESCRIPTION OF THE DRAWINGS

The above and other features and aspects of the present invention will become more apparent upon reading the following detailed description in conjunction with the following drawings in which.

DETAILED DESCRIPTION

Figure 1:
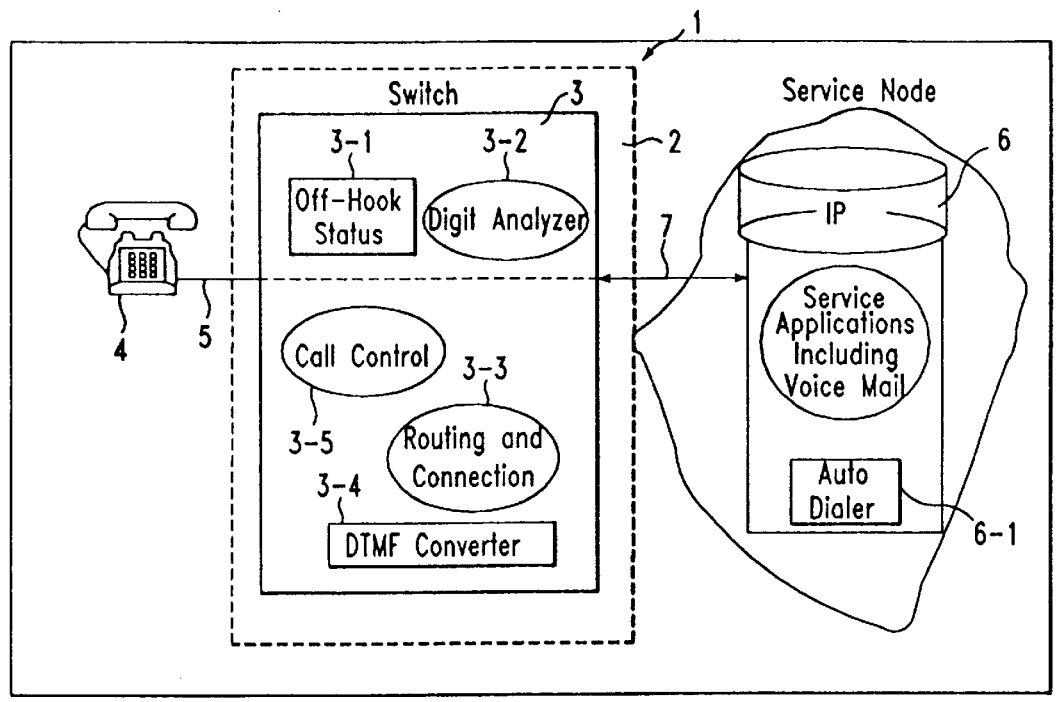
FIG. 1 shows a telephone system utilizing an electronic switch and SN/IP in accordance with the principles of the present invention.

FIG. 1 shows a telephone system 1 in accordance with the principles of the present invention. The system 1 comprises a central office 2 which includes an electronic switch 3. The switch 3 controls routing and connection, i.e., communication, of telephone calls to and from telephone subscribers 4 served by the central office and connected thereto over links 5. The switch also controls routing and connection of calls to a service node/intelligent peripheral device (SN/IP) 6 over a further link 7.

The SN/IP, in the present example, is shown as an interactive system which provides subscribers connected thereto with prompts and responses and which responds to requests from the subscribers. A typical type of system might be a voice interactive system such as, for example, a voice mail system.

Also in the present example, SN/IP 6 communicates with the switch 3 via DTMF signaling which is usual for these types of devices. The subscribers 4, on the other hand, may communicate with the switch 3 either using either dial pulse signaling or DTMF signaling and may utilize analog or a digital telephone stations.

The switch 3, as shown, is a program driven digital switch having standard routing and connectivity functions. Typical functions might be those available in so-called "class 5" digital telephone switches such as, for example, AT&T's No. 5 ESS or Northern Telcom's DMS-100. Functions or features available via such switches might be for example, call waiting, call transfer, call forwarding and directed call pickup.

Certain of the basic functions carried out by the switch have been represented pictorially in the figure. As can be seen, the switch includes an off-hook status functionality 3-1 for detecting the off-hook status of the subscribers 4 and SN/IP served by the switch. The switch also contains a call routing digit receiver and analyzer functionality 3-2 which receives and analyzes incoming digits to determine call routing actions based on the digits.

A call routing and connection functionality 3-3 effects call routing and connection based upon the determinations made by the digit analyzer functionality. A further conversion functionality for converting dial pulse digits received at the switch to DTMF digits for transmission from the switch is also provided. These functionalities as well as all other functionalities of the switch are controlled by a control functionality 3-5.

In accordance with a first aspect of the present invention, the functionality of switch 3 is further adapted so as to enable automatic routing and connection of a subscriber 4 to the SN/IP 6 when the subscriber is in an off-hook status i.e., when the subscriber initially goes off-hook or is returned to an off-hook status during call processing. Furthermore, this adaptation is such that during the automatic routing and when connected to the SN/IP 6, as a result this routing, the switch 3 is still able to receive and respond to dialed digits from the subscriber. In particular, the switch 3 is configured such that upon receipt of such dialed digits, the switch 3 ceases the routing and connection processing of the subscriber to the SNIIP and then proceeds with connection and routing based upon the dialed digits. In effecting such cessation, the switch 3 may cease the routing during the routing process itself, or it may allow the routing and connection to be effected and then drop the connection, or if connection has occurred, the switch will drop the connection.

With the switch configured in this manner, the switch exhibits a mode of operation, i.e., referred to as the "implicit mode", which allows a subscriber in off-hook status immediate access to the SN/IP 6 without the need to dial. Furthermore, in this implicit mode of the switch, a subscriber's dialed digits will be accepted by the switch so that the subscriber can place a call without having to hang-up.

Figure 2:
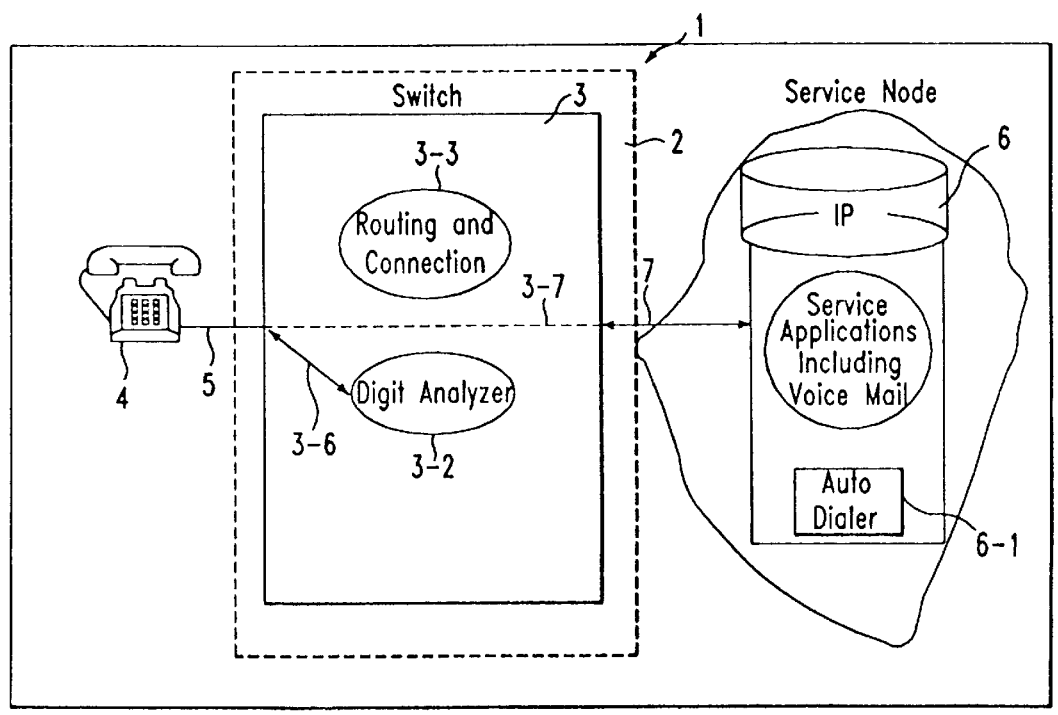
FIG. 2 shows the telephone system of FIG. 1 with the electronic switch and SN/IP operating in implicit mode.

This action of the switch 3 is schematically shown in FIG. 2 by the connecting path 3-6 between the digit analyzer functionality 3-2 of the switch 3 and the subscriber 4 and the simultaneous connecting path 3-7 to the SN/IP through the routing functionality 3-3. Depending upon the character of the SN/IP 6, the connection to the subscriber 4 may be responded to by an announcement or tone or the SN/IP 6 may simply wait for prompts from the telephone station to initiate an interactive session. The SN/IP 6 may also immediately provide messages to the subscriber 4 if this operation is desired.

In effecting automatic connection of the off-hook subscriber 4 to the SN/IP 6 as above-described, the switch 3 is adapted to provide dial tone to the subscriber in usual fashion. Also, the routing and connection functionality 3-3 in setting up the connection to the SN/IP 6 transmits the subscriber's identification number and service code which can be used by the SN/IP for identification, tracking and other purposes as desired. When the functionality 3-3 completes the connection and the communication path 3-7 is established, dial tone to the subscriber 4-1 is dropped and the subscriber has immediate voice path access to the SN/IP 6.

As above-indicated, once the communication path 3-7 is in place, the subscriber 4 can interact with the SN/IP 6 in usual fashion. When the subscriber completes this activity, if the subscriber hangs-up, the switch 3, via its described functionality, detects the change in off-hook status i.e., recognizes the on-hook condition) and, as a result, drops the connection to the SN/IP and releases its other functionalities from the subscriber. Alternatively, if the subscriber dials a number this dialing, as above-described, will cause the switch 3 to drop the connection to the SN/IP. The switch then proceeds to normally process the dialed call via the digit analyzer and routing functionalities.

When connected to the SN/IP 6 in this implicit mode the switch 3 is also adapted to treat the off-hook subscriber as busy. Call waiting tone will thus not be received during this mode of operation and will be responded to by the switch with a busy signal. Furthermore, hook a flash or from the subscriber 4 will cause the switch 3 to drop the connection to the SN/IP 6 detects the hook flash. At the end of the hook-flash and return of the signal condition off-hook, the switch 3 again detects off-hook status for the subscriber 4, the connection to the SN/IP 6 will be reestablished as above-described.

In accordance with a further aspect of the invention, the switch 3 is additionally adapted to enable access to the SN/IP 6 over a stable communication path which can be affected in standard fashion via access code dialing. In this so-called "explicit mode" of operation, an off-hook subscriber 4 dials an access code which is understood by digit analyzer functionality 3-3 of the switch to require routing and connection to the SN/IP 6. This dialing is processed in normal fashion by the routing functionality to establish a stable communication path to the subscriber.

Since the subscriber must dial digits to invoke the explicit mode, the automatic connection to the SN/IP 6 established when the subscriber goes off-hook is dropped when explicit mode is initiated. Also, since explicit mode is effected by normal processing, the subscriber 4 no longer has access to the digit analyzer, routing and other functionalities of the switch 3. As a result, in order to dial a further number, the subscriber must perform some additional action other than merely dialing digits, as in implicit mode.

The subscriber's lack of access to the switch functionalities prevents digits being transmitted by the subscriber in explicit mode from being applied to the conversion functionality 3-4. As a result, a subscriber 4 operating on dial pulse signaling, cannot effectively communicate with the SK/IP 6 in explicit mode.

In accordance with this aspect of the invention, the switch 3 is further adapted to overcome this shortcoming by allowing access of the subscriber in explicit mode to the conversion functionality 3-4 of the switch. As a result, subscribers with dial pulse signaling will have this signaling converted to DTMF signaling which can now be accepted by the SN/IP 6.

Figure 3:
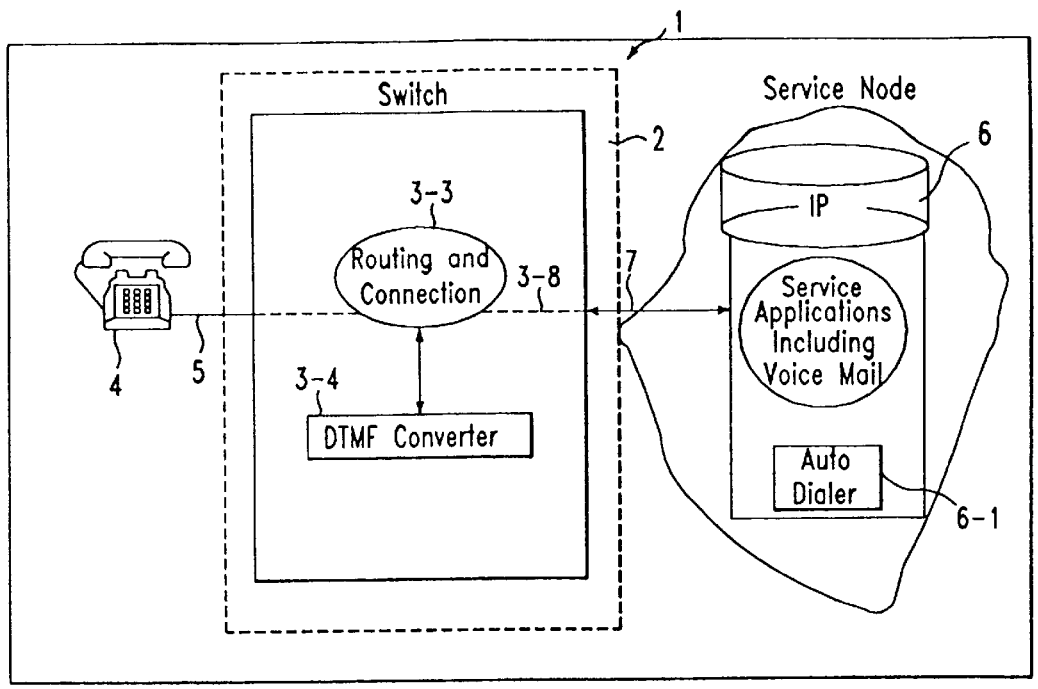
FIG. 3 shows the telephone system of FIG. 1 with the electronic switch and SN/IP operating in explicit mode.

The above aspect of the invention is illustrated in FIG. 3 which illustrates a subscriber 4 operating in explicit mode. As can be seen, a stable communication path 3-8 is established between the subscriber 4 and SN/IP 6 through the routing functionality 3-3. This path has access to the conversion functionality 3-4, but not the digit analyzer functionality 3-3, as above-described.

In the explicit mode of operation, a subscriber 4 (either dial pulse or DTMF) can now interact with the SN/IP 6 in usual fashion over the stable communication path 3-8. Once the subscriber 4 goes on-hook, the communication path to the SN/IP 6 is disconnected by the switch in usual fashion. Also, in explicit mode, any hook flash or similar signaling function is passed to the SN/IP 6 and processed by the switch in usual fashion. Thus, for example, a hook flash response to a call waiting tone will enable the subscriber to access the call waiting feature, while the stable connecting path 3-8 to the SN/IP 6 is placed on in-hold accordance with normal call waiting processing.

In accordance with yet a further aspect of the present invention, the switch 3 and the SN/IP 6 are additionally adapted such that, at the request of a subscriber, the SN/IP is able to provide signaling to the switch 3 over a communication path between the subscriber and SN/IP established by the switch in implicit or explicit mode. The ability to provide this signaling permits the SN/IP 6 to perform dialing for the subscriber as well as to invoke other call features or functions in the subscriber's assigned dialing plan. The switch 3, in turn, is adapted to respond to this signaling by processing the dialing or invoked functions as if placed by the subscriber 4, including allocating any billing to the subscriber. The above is illustrated in FIGS. 1–3 which show the SN/IP 6 as configured to have a signal generator and auto dialer 6-1 for signaling the switch 3 and dialing numbers based on requests from subscribers 4 connected to the SN/IP.

More particularly, upon receipt of dial commands from a subscriber 4, the SN/IP 6 via its dialer 6-1 provides a preselected signal to the switch 3. This signal when received at the switch causes the switch functionalities to place the subscriber 4 on hold and to give the SN/IP 6 access to the digit analyzer functionality 3-2. The SN/IP 6 then dials the digits of the number to be called and upon receipt of the digits by the switch 3, the switch functionalities drop the connection to SN/IP 6 and process the dialed digits in normal fashion. The switch 3, however, interprets the call as if it were placed by the subscriber 4 and, thus, billing records and other attributes of the call normally developed by the switch 3 are associated with the subscriber.

Figure 4:
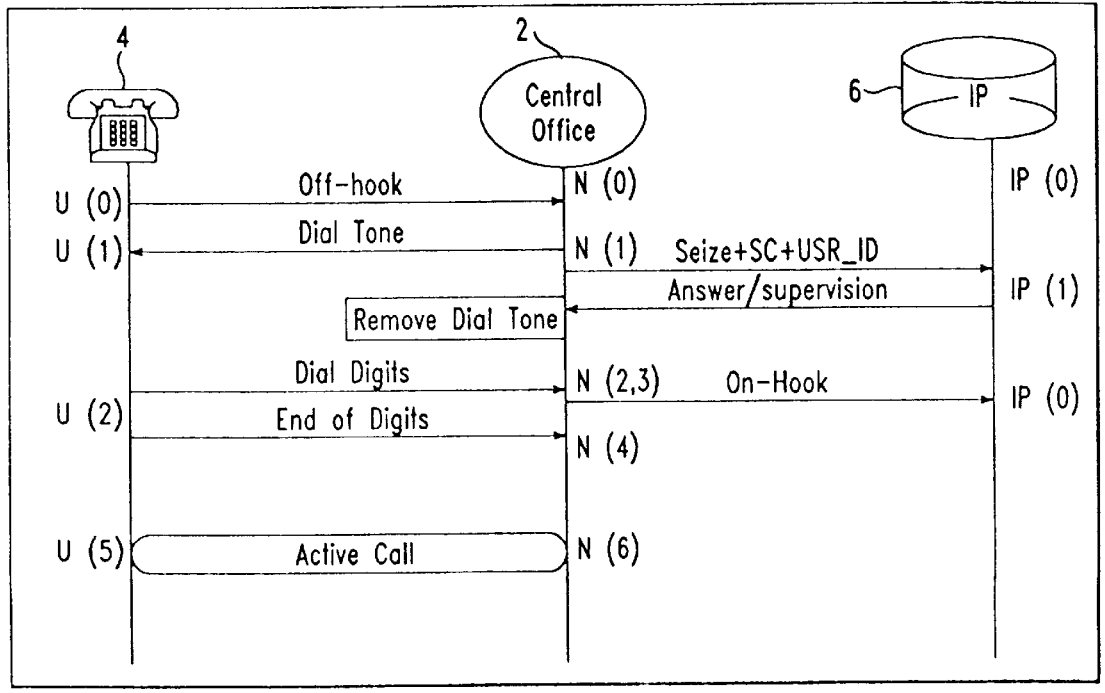
FIG. 4 illustrates in simplified form various states of the subscriber, electronic switch and SN/IP of the system of FIG. 1 where a call is made without assistance by the SN/IP.
Figure 5:
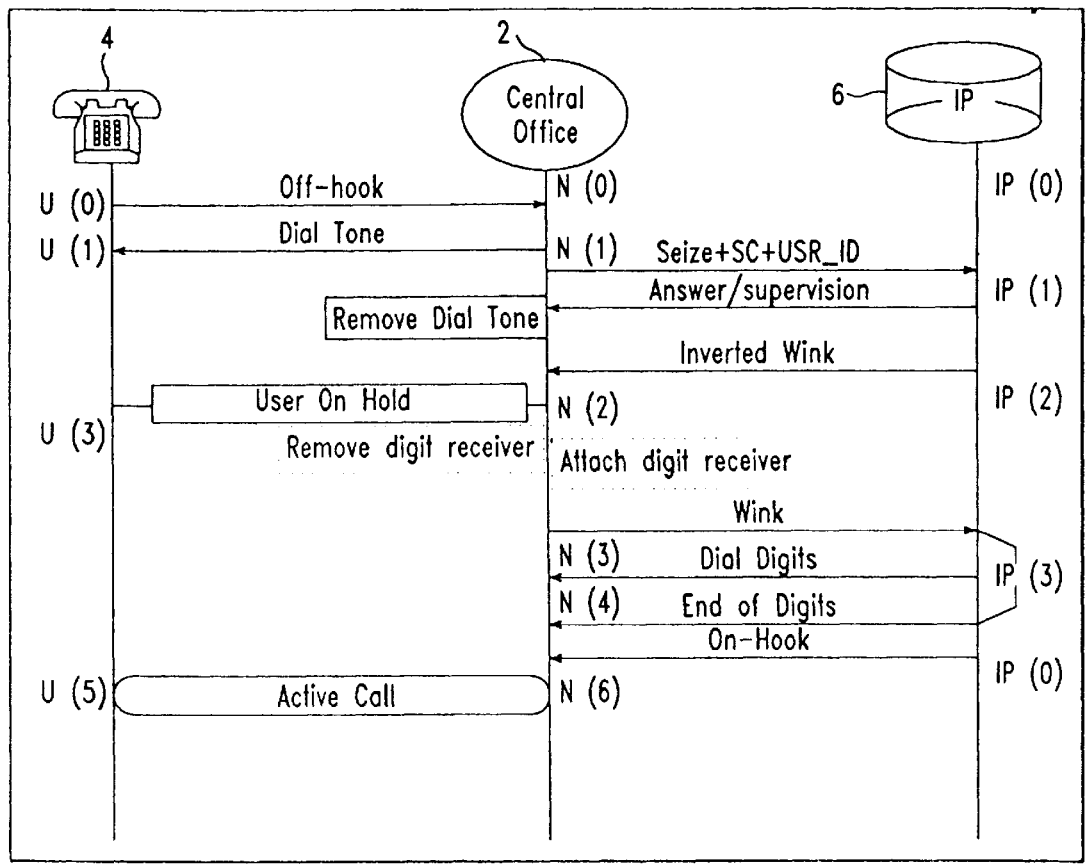
FIGS. 5 and 6 illustrate in simplified form various states of the subscriber, electronic switch and SN/IP for the system configurations of FIGS. 2 and 3 and where a call is made with interaction of the SN/IP.
Figure 6:
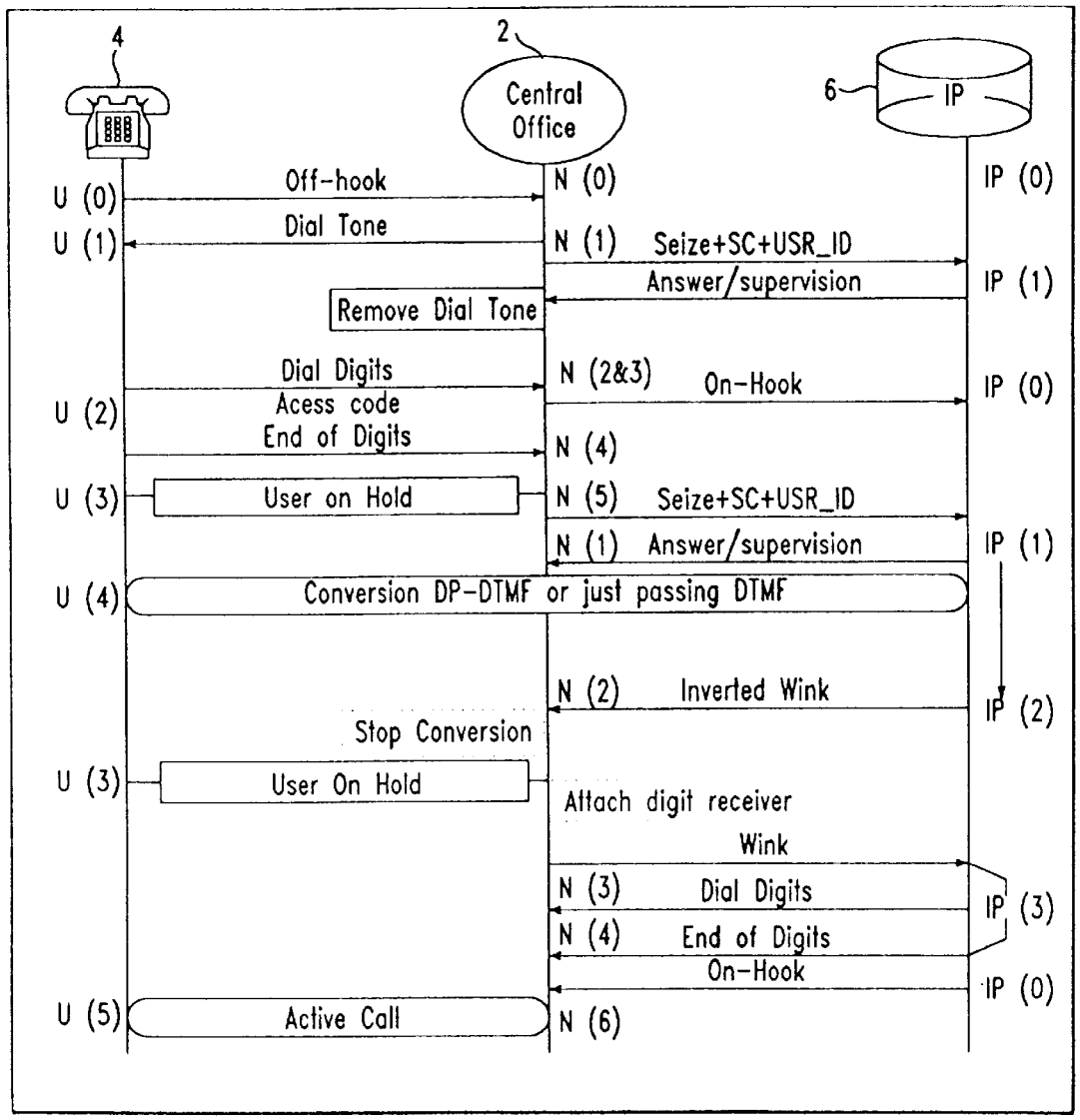

FIGS. 5 and 6, illustrate the states of the subscriber 4, the switch 3 and SN/IP 6 for the aforesaid auto-dial operation effected in implicit and explicit modes, respectively. FIG. 4, in turn, illustrates these states for direct dialing by the subscriber 4 in implicit mode.

Referring to FIG. 4, in response to a subscriber 4 going off-hook (state U(0)), the switch 3 (state N(1)) seizes a trunk in the link 7 to the SN/IP 6 and transmits the service code and identification number (USR_ID) of the subscriber to the SN/IP (state IP(1)). The switch 3 (state N(1)) also makes available to the subscriber the digit analyzer functionality 3-3 as well as sends the subscriber dial tone (state U(1)).

Upon the SN/IP 6 transmitting answer/supervision to the switch 3, the switch 3 removes dial tone from the subscriber. When the subscriber then dials (state U(2)), the switch 3, upon receipt of the digits, drops the connection to the SN/IP 6, causing the latter to return to on-hook status (state IP(0)). The switch 3 then continues to receive the digits and at the end of the digit transfer, (state N(4)), processes the dialed digits, resulting in an active call status (states N(6) and U(5)) for the switch 3 and subscriber 4.

If instead of the subscriber 4 dialing the number to be called the subscriber requests the SN/IP 6 to perform the dialing, the states of the subscriber, switch and SN/IP in implicit mode are similar to those shown in FIG. 4 to the point of removal of dial tone to the subscriber. At this point, as shown FIG. 5, the SN/IP 6 signals (shown as an inverted wink) the switch 3 that it is dialing for the off-hook subscriber.

Upon receipt of this signal, the switch 3 places the subscriber on hold (state U(3)) and disables the subscriber from access to the digit analyzer functionality (state N(2)). The, switch also at this time grants access to the digit analyzer functionality to the SN/IP 6. The switch 3 then signals (shown as a wink) the SN/IP (state IP(3) which responds by transmitting (state IP(3)) the dialed digits upon receipt of all the digits (states N(3) and N(4)), the switch drops the connection to SN/IP 6 causing it to return to on hook status (state IP(O)). The switch then completes processing of the call as if made by the; subscriber 4 (states N(6) and U(5)).

In the event the subscriber wishes the SN/IP to dial in explicit mode, again the initial states of the switch, subscriber and SN/IP to the point of removal of dial tone to the subscriber are as shown in FIG. 4. The subsequent states are shown in FIG. 6 and are initiated by the subscriber dialing the appropriate access code digits for the SN/IP 6. The switch 3, initially in implicit mode, upon receipt of these digits, first drops the connection to the SN/IP (states N(2&3)), placing the SN/IP on-hook (State IP(0).

At the end of digit transfer from the subscriber, the switch 3 (state N(4)) places the subscriber on hold, analyzes the digits and responds thereto by reestablishing a connection to the SN/IP (state N(5)) i.e., seizes link to SN/IP, transmits service code and identification (state N(5)) and obtains answer/supervision from SN/IP (state N(1)). The switch 3 also acts at this time, if necessary, to convert dial pulse signaling from the subscriber to DTMF signaling for the SN/IP.

If the SN/IP 6 is now instructed to dial a call by the subscriber 4, the procedure follows a similar procedure as that described and shown in FIG. 6. More particularly, the SN/IP signals the switch 3 (shown as an inverted wink) which causes the switch (state N(2)) to stop conversion, place the user on hold and grant access to the digit analyzer functionality to the SN/IP. The switch also then signals the SN/IP (shown as a wink) (state IP(3)).

The SN/IP thereupon transmits the digits (state IP(3)) and at the end of digit transfer (states N(3), N(4)), the switch 3 places the SN/IP on hook (state IP(0)). The switch 3 then processes the call in normal fashion (states U(5) and N(6)), as if placed by the subscriber.

Figure 7B:
FIG. 7 is a more comprehensive chart showing the states of the subscriber, electronic switch and SN/IP for various operating conditions of the system of FIGS. 1–3.

FIG. 7 shows a more detailed version of the states of the switch 3, subscriber (also referred to as user) and SN/IP for the different operating modes discussed above. The references and abbreviations used in FIG. 7 have the same meanings as used herein and based upon the descriptions hereinabove and hereinbelow the chart is believed to be self explanatory and not in need of further detailed discussion.

It should be noted that in performing the functions described above, the switch 3 and SN/IP 6 are configured so that the normal constraints of the standard receiver off hook (ROH) timer (e.g., approximately 20 seconds) are satisfied during all call processing. Furthermore, to ensure that the conversion from dial pulse to DTMF signaling can occur in satisfactory fashion, the holding times of any digit receivers used in the switch 3 for this purpose must be adjusted to accommodate the required holding times. The switch 3 configuration further provides that all calls complete in usual fashion with respect to the terminating parties class of service (i.e, the terminating station group restrictions and terminating features,e.g., call forwarding, ringing, etc.)

It should also be noted that the design of the switch 3 is such that if no answer/supervision is received from the SN,TIP 6 during routing and connection to establish implicit mode, the switch 3 does not effect connection and the subscriber continues to receive dial tone. In such case, switch operation will continue as normal POTS operation. In the case of the explicit mode, however, since the subscriber has explicitly requested connection to the SN/IP, if the SN/IP is busy, the usual recorder tone will be received by the subscriber to indicate that the request cannot be fulfilled.

Also, when in implicit mode of operation, a hook flash by the subscriber will be understood by the switch 3 as requiring that the switch disconnect from the SN/IP 6 and then institute another reconnection procedure to the SN/IP. If a subscriber is connected to the another party or to the SN/IP in explicit mode (i.e., a stable talking path), then a hook flash by the subscriber station is processed by the switch 3 in usual fashion by placing the other party or SN/IP on hold and then the switch 3 institutes a further connection to the SN/IP in implicit mode.

The functioning of the SN/IP 6 to provide signaling for the subscriber can also be utilized in explicit mode operation to permit the subscriber to terminate explicit mode and return to implicit mode. Thus, upon the subscriber transmitting a predetermined message indicating return to implicit mode, the SN/IP 6 will signal the switch 3 with a message indicating the connection to the SN/IP 6 in explicit mode should be dropped. When this occurs, the switch 3 will return off-hook status to the subscriber 4 and, as a result, institute reconnection to the SN/IP in implicit mode.

The discussion of explicit mode operation and the features of dial pulse to DTMF conversion and signaling by the SN/IP were described above in a system 1 which also has implicit mode operation. However, these features can be used in an explicit mode operating system not having an implicit mode. Also, the signaling feature of the SN/IP can be used in an implicit mode system which does not have an explicit mode.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method of operating a telephone system including a switch comprising the steps of:
   operating the switch to detect an off-hook status of a subscriber coupled to the switch;
   in response to detecting the off-hook status of a subscriber, operating the switch to establish a connection between the subscriber and an interactive peripheral device, the step of establishing a connection to the peripheral device including sending subscriber identification information to the peripheral device;
   monitoring the established connection to detect a DTMF signal from the subscriber; and
   upon detecting the DTMF signal from the subscriber terminating the connection established by the switch between the subscriber and the peripheral device.

2. The method of claim 1,
   wherein the DTMF signal from the subscriber represents dialed digits, and
   wherein the method further comprises the step of: operating the switch to perform a call routing operation in response to the dialed digits.

3. The method of claim 2, wherein the peripheral device is a voice interactive system.

4. The method of claim 3,
   wherein the voice interactive system is a voice mail system; and
   wherein the switch is a program driven digital switch.

5. The method of claim 2, further comprising the step of:
   operating the switch to transmit an identification number associated with the subscriber to the peripheral device.

6. The method of claim 2, further comprising the step of:
   operating the peripheral device to provide subscribers connected thereto with prompts.

7. The method of claim 6, wherein the switch is a program driven digital switch.

8. The method of claim 7, wherein said subscriber identification information includes an identification number associated with the subscriber.

9. The method of claim 1, wherein said subscriber identification information includes an identification number associated with the subscriber.

10. The method of claim 1, further comprising the step of:
    operating the switch to respond to a call waiting signal with a busy signal when the subscriber is off-hook.

11. The method of claim 1, further comprising the step of:
    operating the peripheral device to provide subscribers connected thereto with prompts.

12. A method of operating a telephone system including a switch comprising the steps of:
    operating the switch to detect an off-hook status of a subscriber coupled to the switch;
    in response to detecting the off-hook status of a subscriber, operating the switch to generate and provide a dial tone to the subscriber and to establish a connection between the subscriber and a peripheral device;
    monitoring the established connection to detect a DTMF signal from the subscriber;

upon detecting the DTMF signal from the subscriber terminating the connection established by the switch between the subscriber and the peripheral device; and operating the peripheral device to immediately provide a message to the subscriber upon establishment of the connection between the peripheral device and the subscriber.

13. The method of claim 12, wherein said peripheral device is a voice interactive peripheral device.

14. A method of operating a telephone system including a switch comprising the steps of:

operating the switch to detect an off-hook status of a subscriber coupled to the switch;

in response to detecting the off-hook status of a subscriber, operating the switch to establish a connection between the subscriber and a peripheral device;

monitoring the established connection to detect a DTMF signal from the subscriber;

upon detecting the DThF signal from the subscriber terminating the connection established by the switch between the subscriber and the peripheral device;

providing a dial tone to the subscriber while establishing the connection between the subscriber and the peripheral device; and discontinuing the dial tone upon establishment of the connection between the subscriber and the peripheral device.

15. A method of operating a telephone system including a switch comprising the steps of:

detecting an off-hook status of a subscriber coupled to the switch;

in response to detecting the off-hook status of a subscriber, operating the switch to begin a process of establishing a connection between the subscriber and a peripheral device;

detecting a DTMF signal from the subscriber; and upon detecting the DTMF signal from the subscriber, performing the steps of:
  i. terminating the process of establishing the connection between the subscriber and the peripheral device; and
  ii. operating the switch to perform a call routing operation in response to the DTMF signal.

16. The method of claim 15, wherein the DTMF signal represents dialed digits, and wherein the step of operating the switch to perform a call routing operation involves using digit analyzer functionality included within the switch.

17. The method of claim 16, further comprising the steps of:

operating the peripheral device to immediately provide a message to the subscriber upon establishment of the connection between the device and the subscriber.

18. The method of claim 16, further comprising the step of:

operating the switch to transmit an identification number associated with the subscriber to the peripheral device.

19. The method of claim 15, wherein the peripheral device is a voice interactive system.

20. The method of claim 19, wherein the voice interactive system is a voice mail system; and wherein the switch is a program driven digital switch.

21. The method of claim 15, further comprising the step of:

operating the switch to transmit an identification number associated with the subscriber to the peripheral device.

22. The method of claim 15, further comprising the steps of:

providing a dial tone to the subscriber while establishing the connection between the subscriber and the peripheral device.

23. The method of claim 22, further comprising the step of:

operating the switch to respond to a call waiting signal with a busy signal when the subscriber is off-hook.

24. A system for use with a telephone, the system comprising:

a peripheral device including means for generating a prompt and for responding to input received from the telephone;

a switch for coupling the telephone to the peripheral device, the switch including:
  i. off-hook status detection means for detecting an off-hook status condition of the telephone;
  ii. means for establishing a connection between the telephone and the peripheral device in response to the detection of an off-hook status condition;
  iii. a digit analyzer for detecting DTMF tones received from the telephone; and
  iv. means for terminating the connection established by the switch between the telephone and the peripheral device when a DTMF tone is detected by the digit analyzer.

25. The system of claim 24, wherein the peripheral device further includes:

a service application.

26. The system of claim 25, wherein the peripheral device further includes an auto dialer.

27. The system of claim 26, wherein the switch further includes:

means for performing a call routing operation in response to DTMF tones detected by the digit analyzer.

28. The system of claim 24, wherein said peripheral device is a voice interactive peripheral device.

29. A telephone system comprising:

a telephone;

a peripheral device;

a switch for coupling the telephone to the peripheral device, the switch including:
  i. off-hook status detection means for detecting an off-hook status condition of the telephone;
  ii. means for beginning a process of establishing a connection between the telephone and the peripheral device in response to the detection of an off-hook status condition;
  iii. a digit analyzer for detecting DTMF tones received from the telephone; and
  iv. means for terminating the process of establishing a connection between the telephone and the peripheral device when a DTMF tone is detected by the digit analyzer.

30. The system of claim 29, wherein the peripheral device further includes:

a service application.

31. The system of claim 30, wherein the peripheral device further includes an auto dialer.

32. The system of claim 31, wherein the switch further includes:

means for performing a call routing operation in response to DTMF tones detected by the digit analyzer.

33. The system of claim 29, wherein said peripheral device is a voice interactive peripheral device.

34. A telephone switch for coupling a telephone to a voice interactive peripheral device, the telephone switch comprising:
  off-hook status detection means for detecting an off-hook status condition of the telephone;
  means for establishing a connection between the telephone and the voice interactive peripheral device in response to the detection of an off-hook status condition;
  a digit analyzer for detecting DTMF tones received from the telephone; and
  means for terminating the connection established by the switch between the telephone and the peripheral device when a DTMF tone is detected by the digit analyzer.

35. A telephone switch for coupling a telephone to a peripheral device, the telephone switch comprising:
  off-hook status detection means for detecting an off-hook status condition of the telephone;
  means for beginning a process of establishing a connection between the telephone and the peripheral device in response to the detection of an off-hook status condition;
  a digit analyzer for detecting DTMF tones received from the telephone; and
  means for terminating the process of establishing a connection between the subscriber telephone and the peripheral device when a DTMF tone is detected by the digit analyzer.

36. A method of operating a telephone system including a switch comprising the steps of:
  operating the switch to detect an off-hook status of a subscriber coupled to the switch;
  in response to detecting the off-hook status of a subscriber, operating the switch to generate and provide a dial tone to the subscriber and to establish a connection between the subscriber and a peripheral device;
  monitoring the established connection to detect a DTMF signal from the subscriber; and
  upon detecting the DTMF signal from the subscriber terminating the connection established by the switch between the subscriber and the peripheral device.

37. A system for use with a telephone, the system comprising:
  a voice interactive peripheral device;
  a switch for coupling the telephone to the voice interactive peripheral device, the switch including:
    i. off-hook status detection means for detecting an off-hook status condition of the telephone;
    ii. means for establishing a connection between the telephone and the voice interactive peripheral device in response to the detection of an off-hook status condition;
    iii. a digit analyzer for detecting DTMF tones received from the telephone; and
    iv. means for terminating the connection established by the switch between the telephone and the voice interactive peripheral device when a DTMF tone is detected by the digit analyzer.

* * * * *